United States Patent [19]

Astrove

[11] 4,177,966
[45] Dec. 11, 1979

[54] MIRROR ASSEMBLY USING MIRROR, CLAMPS AND STANDOFF AXLES

[76] Inventor: Edgar Astrove, 35 Stratton Rd., Scarsdale, N.Y. 10583

[21] Appl. No.: 912,336

[22] Filed: Jun. 5, 1978

[51] Int. Cl.² ............................................. A47G 1/17
[52] U.S. Cl. .................................................. 248/467
[58] Field of Search .............. 350/307, 304, 303, 288; 248/467, 480, 475 A, 479

[56] References Cited

FOREIGN PATENT DOCUMENTS 866514  7/1962  France ..................................... 350/303

*Primary Examiner*—Jon W. Henry

*Attorney, Agent, or Firm*—Carl C. Kling

[57] ABSTRACT

A mirror assembly for vehicular applications, yielding wide-angle viewing, which is simple, inexpensive, easily installable, easily adjustable and of low distortion. The mirror assembly comprises a mirror, four adhesive backed clamps, and a set of standoff axles. The mirror is positioned and held by the set of standoff axles, which are held to the mirror by two of the clamps and to the windscreen by two of the clamps, the mirror and windscreen providing strength and support to the mirror assembly in such fashion that the mirror is adjustable by rotation on the standoff axles while remaining stably positioned in the vehicle.

6 Claims, 6 Drawing Figures

MIRROR ASSEMBLY USING MIRROR, CLAMPS AND STANDOFF AXLES

BRIEF SUMMARY OF THE INVENTION

The invention is a simple, inexpensive and easily installable wide angle rearview mirror for vehicles, yielding a continuous and stable image of the rearward panorama, which mirror is easily adjustable and of minimal distorion, of minimal obstruction to front vision, and is compatible both physically and optically with an existing rearview mirror.

A feature of the invention is the use of adhesive backed mounting clamps and angularly formed axles to provide a standoff mounting for the mirror, in which the mirror is permanently positioned but can still be adjusted vertically, laterally and rotationally to the visual accommodation of drivers of varying heights, retaining the adjustment despite shocks and vehicular vibration.

An advantage is that the mounting and the mirror can be easily manufactured of few parts and of inexpensive materials; the mounting permits the use of a continuous mirror of minimal distortion, whether flat or curved at the periphery, as contrasted to articulated or convex mirrors most commonly used in wide-angle applications.

Another advantage is that the mirror assembly can be easily mounted, on a great variety of vehicles having windscreens of varying curvatures and slopes, such mounting requiring neither tools nor training, and once mounted is stable and resistant to misadjustment due to shock and vibration typical of moving vehicles.

Another advantage is that the mirror assembly can be made lightweight and the mirror itself shatterproof, the light weight being in part due to the use of the mirror itself and the windscreen, to which the mirror assembly is mounted, to provide strength and rigidity.

DRAWINGS

DETAILED DESCRIPTION

Figure 1:
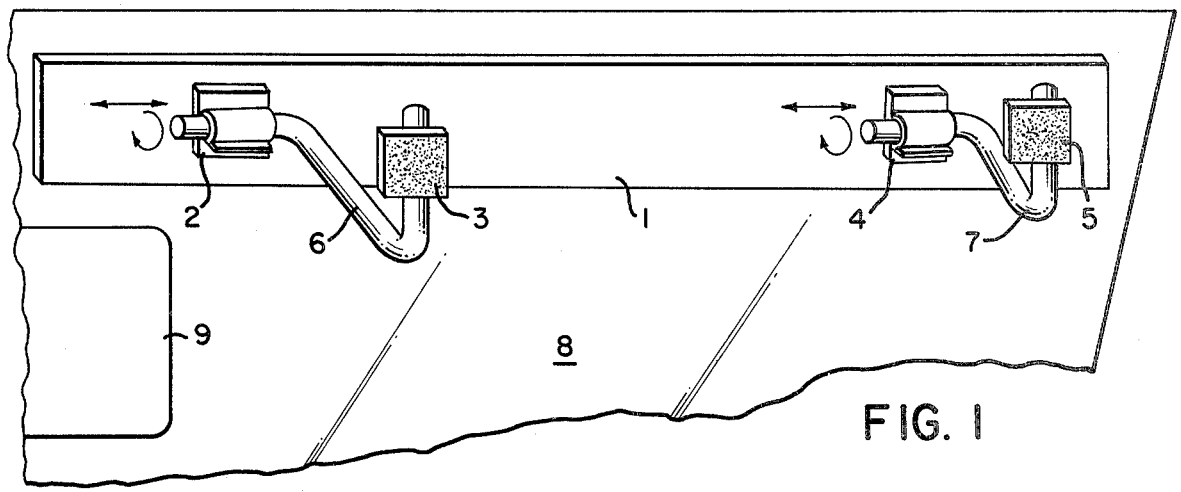
FIG. 1 is a front view, through a windscreen, of a preferred embodiment of the invention. The view is at a slight angle to unmask the details.

In the preferred embodiment shown in FIG. 1, the mirror assembly comprises seven parts, four of which may be identical and two of which may be made so as to differ only in length. This simplicity provides low-cost manufacturability. The entire parts list is mirror 1, adhesive backed clamps 2, 3, 4 and 5, and standoff axles 6 and 7, which are similar except for length of standoff. This differing standoff length is to compensate for the curvature of the windscreen 8 in the typical vehicle. The mirror assembly according to the invention is normally installed by attachment to the glass or frame of the windscreen, without interfering with the original mirror 9. Mirror 1 is preferably an elongated piece cut from a sheet of commercially available mirrored acrylic plastic, used without further framing or backing. I prefer a piece about 35 millimeters in width by about 600 millimeters in length, of about 3 millimeters thickness. The mirror must be relatively long to function as a wide angle mirror, and this is the usual configuration. Since the length of the mirror may need to be varied according to the space available for mounting, adjustment may be required. With care, the ordinary person can adjust the length of the mirror be sawing off one end with a hacksaw, or by deep line scratching and breaking off the end much as glass is cut.

Mirror 1 is mounted by assembling adhesive clamps 2, 3, 4 and 5 with standoff axles 6 and 7 to form a subassembly, and then mounting the subassembly onto the inside of the windscreen to form the completed final assembly as well as the mounting. Clamps 2, 3, 4 and 5 are preferably light-weight extrusions of plastic, with adhesive backs, with a tension sufficient to provide friction which will impede sliding and rotational motion of a matching size axle. Capacitor clips or other adhesive backed spring clips will also serve. For shipping, clamps 2, 3, 4 and 5 may be equipped with peelable protective layers (not shown) and for convenience in making a trial installation the peelable protective layer may itself be sticky or may be arranged for partial peeling so as to expose a small spot of adhesive which will permit a trial assembly to be installed, removed, and then to be properly installed, after full peeling to expose the entire adhesive back, for a permanent installation.

Standoff axles 6 and 7 are configured in three portions which may be designated hanger portion, standoff portion and axle portion. The function of the standoff axle is to present the reflective mirror 1 at a position vertically removed from the viewer's forward view but essentially parallel to the horizon. The hanger portions coact with windscreen mounted clamps 4 and 5 to provide basic positioning and support, accommodating local curvature of the wind-screen. Standoff portions of standoff axles 6 and 7 may be of differing lengths so as to compensate for the curvature of windscreen 8, to maintain an appropriate viewing perspective for the viewer in the typical installation.

Axle portions of standoff axles 6 and 7 coact with mirror mounting clamps 2 and 4, respectively, to provide support to mirror 1. Mirror mounting clamps 2 and 4 are preferably mounted close to the centerline of mirror 1, to create a substantially balanced hinge, which is advantageous in resisting rotational motion due to shock and vibration. With the mirror assembly firmly mounted in place, with each of clamps 2, 3, 4 and 5 firmly attached by its adhesive back, clamping its respective standoff axle in place, windscreen 8 becomes part of the assembly and the assembly is structurally established in all planes. After installation, vertical and horizontal adjustments can be made by longitudinal sliding of the standoff axles 6 and 7 within clamps 2, 3, 4 and 5, as shown by the arrows in FIG. 1.

Once installed, and adjusted to the vehicle, the mirror presentation remains constant and stable as the mirror assembly is held by the physical force of friction with standoff axles 6 and 7 gripped by their respective clamps 2, 3 and 4, 5. The mirror presentation remains constant until changed by a new viewer who needs a different presentation because of height or other human factors. In the usual case, the only change necessary for adjustment to a new viewer is a simple rotational change of the mirror position on its standoff axles.

Figure 2:
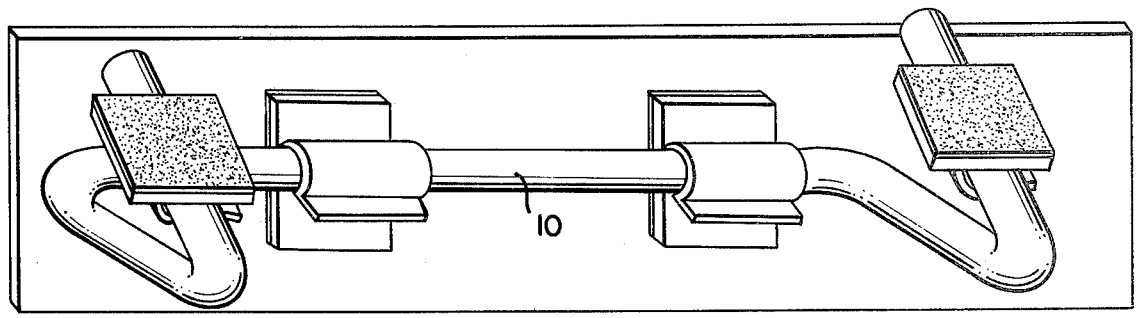
FIG. 2 is a front view of a second embodiment, shown as a subassembly before mounting in the vehicle, the second embodiment having an integrally formed set of standoff axles.

FIG. 2 shows a second embodiment with a single standoff axle having at its two ends two hanger portions arrayed on standoff portions of differing lengths. Standoff axle 10 is mounted on clamps as explained with respect to the embodiment of FIG. 1.

Figure 3:
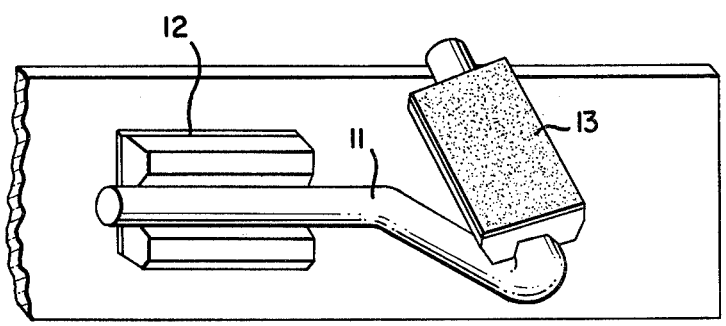
FIG. 3 is a partial detail of a third embodiment, using magnetic clamps.

FIG. 3 shows a third embodiment, in which standoff axle 11 is made of soft magnetizeable steel and adhesive backed permanent magnet clamps 12 and 13 operate through the physical force of magnetism rather than by spring-induced friction as in the embodiments of FIG. 1 and FIG. 2. Magnets 12 and 13 are of permanent type with adhesive backs, commercially available, to adhere to mirror back and windscreen, respectively.

Additional embodiments using combinations of clamps operating through combinations of physical forces, including friction and magnetism, are obvious.

In the preferred embodiments, the standoff axles are arrayed with axle portions approximately normal to the standoff portions and with the hanger portions arrayed at acute angles to the standoff portions and in a plane nominally normal to the plane defined by the axle portion and the standoff portion. The preferred configuration of the standoff axle includes a 90 degree bend between axle portion and standoff portion, and a 35 degree bend included between the standoff portion and the hanger portion. Except where magnetization is used as the physical force for holding the assembly together, I prefer as the material for the standoff axles (6, 7, 11) solid aluminum rod, which has the necessary ductility and strength and is corrosion resistant and attractive, as well as being light in weight.

In all embodiments, the long mirror mounted according to the invention may coexist with the standard mirror. The long mirror, as it is scanned by the viewer, provides a glimpse of a wide range of visually perceptible events of which some may be outside the field of view of the standard mirror. There is minimal distortion because the viewer looks directly into the mirror which is flat or nearly flat in each viewing increment. The wide angle mirror is normally used as a safety device--for warning of encroachments. Distortion of distance perception is unacceptable. The long flat mirror installed according to the invention, even if it is curved at the ends, does not distort distance perceptions as does the convex mirror popularly used for wide angle viewing; it is free of gaps or overlaps common to articulated wide angle mirrors commonly used to obviate distortions of distance perception. The mirror assembly of the invention permits the use of an inexpensive flat mirror which eliminates distortions fundamental to curved and to articulated mirrors and allows valid perspective judgments as required in a safety device.

Figure 4:
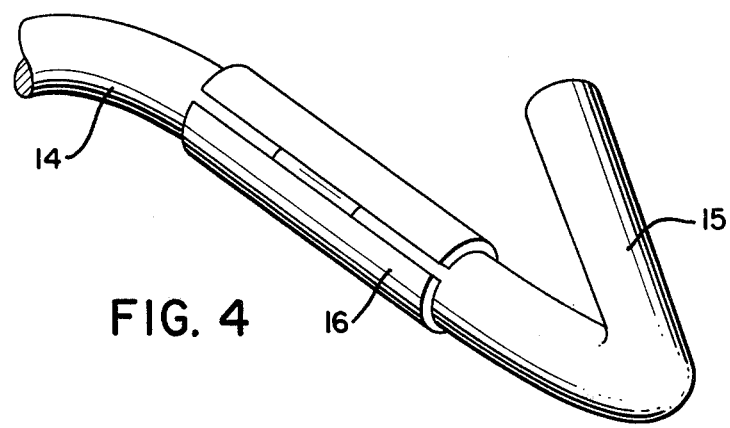
FIG. 4 is a detail of an extendable standoff axle made in two pieces bridged by an extension sleeve.
Figure 5:
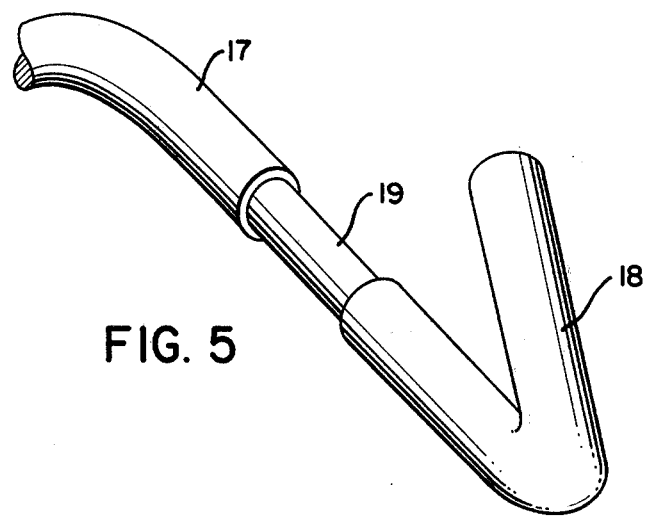
FIG. 5 shows a variation of the bridged standoff axle of FIG. 4, using as the bridge a pin in place of the extension sleeve.
Figure 6:
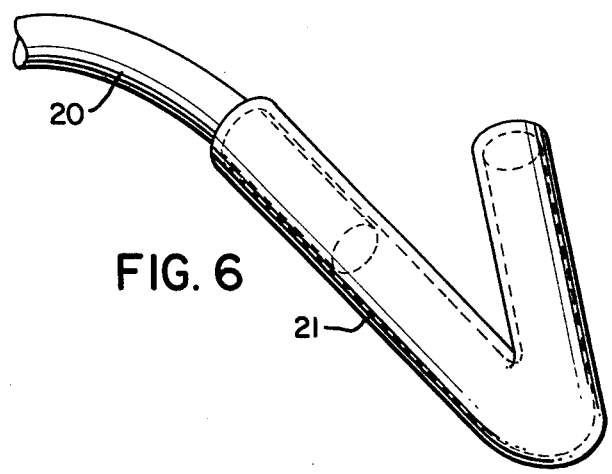
FIG. 6 shows another variation of the extension sleeve of FIG. 4, in which the extension sleeve is integral with one of the portions of the standoff axle.

FIG. 4 shows an extendable standoff axle, made in two pieces 14 and 15 and held together by extension sleeve 16. This configuration provides flexibility so as to accommodate a very wide range of windscreen curvatures and slopes, and has the additional advantage of being subject to shipping in a flat package. Extension sleeve 16 may be of aluminum or of plastic or other material having the characteristic necessary to provide strength and permanence to the standoff axle when assembled and adjusted. Variations of extension sleeves are shown in FIGS. 5 and 6. FIG. 5 shows the standoff axle in two portions 17 and 18, connected by bridging pin 19. FIG. 6 shows the standoff axle in two portions 20 and 21, connected by concentric juxtaposition and friction.

CONCLUDING SUMMARY

This invention provides a mirror assembly which is inexpensive, easy to install and may provide a wide angle view. The assembly includes very few parts and the parts themselves are simple. The assembly includes mirror, clamps and standoff axles, and when installed, utilizes the windscreen itself as a primary support. The standoff axles, when held by clamps fastened to the windscreen and to the mirror, hold the mirror in place by means of a physical force, yet permit easy adjustment by simple rotation or sliding motions.

What is claimed is:

1. A mirror assembly characterized by:
    (a) an elongated mirror having a viewing surface and a back surface;
    (b) first and second mirror clamps attachable to the back surface of said mirror;
    (c) first and second windscreen clamps attachable to a mounting surface such as the inside of a windscreen; and
    (d) a set of standoff axles including first and second axle portions alignable to a single axis and having a multiplicity of bends forming first and second standoff portions essentially normal to the first and second axle portions respectively, and first and second hanger portions each lying within a plane nominally normal to the planes formed by first axle portion and first standoff portion and by second axle portion and second standoff portion;
        said first mirror clamp and said second mirror clamp clamping by a physical force said first and second axle portions permitting rotational movement of said mirror upon application of rotational force, and said first and second windscreen clamps clamping by a physical force said first and second hanger portions.

2. A mirror assembly according to claim 1, further characterized in that said set of standoff axles is made up of a single rod formed with a plurality of bends to form first and second axle portions, first and second standoff portions, and first and second hanger portions.

3. A mirror assembly according to claim 1, further characterized in that said set of standoff axles includes first and second standoff portions which are of differing lengths.

4. A mirror assembly according to claim 1, further characterized in that said first and second mirror clamps and said first and second windscreen clamps are adhesive backed plastic extrusions.

5. A mirror assembly according to claim 1, further characterized in that said set of standoff axles includes magnetizeable axle portions and magnetizeable hanger portions, and said first and second mirror clamps and said first and second hanger clamps are adhesive backed permanent magnets with a recess for locating axle portions and hanger portions of said set of standoff axles.

6. A mirror assembly according to claim 1, further characterized by at least one standoff axle of said set of standoff axles having a discontinuity in the standoff portion, and further characterized by
    extension means bridging such discontinuity, said extension means during assembly permitting adjustment to the related standoff axle.

* * * * *